US012812720B2

(12) United States Patent
Gurumoorthy et al.

(10) Patent No.: US 12,812,720 B2
(45) **Date of Patent: *Nov. 24, 2026**

(54) 5G NR TRS/CSI-RS SIGNALING ASPECTS FOR ENHANCED UE POWER SAVING

(71) Applicant: Apple Inc., Cupertino, CA (US)

(72) Inventors: Sethuraman Gurumoorthy, San Ramon, CA (US); Fangli Xu, Beijing (CN); Haijing Hu, Los Gatos, CA (US); Naveen Kumar R Palle Venkata, San Diego, CA (US); Ralf Rossbach, Munich (DE); Sarma V Vangala, Campbell, CA (US); Srirang A Lovlekar, Fremont, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 367 days.

This patent is subject to a terminal disclaimer.

(21) Appl. No.: 18/467,192

(22) Filed: Sep. 14, 2023

(65) Prior Publication Data

US 2024/0057197 A1 Feb. 15, 2024

Related U.S. Application Data

(63) Continuation of application No. 18/260,356, filed as application No. PCT/CN2021/071909 on Jan. 14, 2021.

(51) Int. Cl.
*H04W 76/20* (2018.01)
*H04B 7/06* (2006.01)
(Continued)

(52) U.S. Cl.
CPC .......... *H04W 76/20* (2018.02); *H04B 7/0626* (2013.01); *H04W 52/0229* (2013.01);
(Continued)

(58) Field of Classification Search
CPC ............. H04W 76/20; H04W 52/0229; H04W 56/0035; H04W 68/02; H04W 76/27;
(Continued)

(56) References Cited

U.S. PATENT DOCUMENTS

| | | | | |
|---|---|---|---|---|
| 2021/0218454 | A1 * | 7/2021 | Nam | H04L 5/0091 |
| 2021/0218529 | A1 * | 7/2021 | Nam | H04L 5/0091 |

(Continued)

FOREIGN PATENT DOCUMENTS

| | | |
|---|---|---|
| CN | 111034300 | 4/2020 |
| WO | 2019/029743 | 2/2019 |

OTHER PUBLICATIONS

3GPP TSG-RAN WG1 #103-e; R1-2009267; Source: Qualcomm Incorporated; Title: TRS/CSI-RS for idle/inactive UE power saving; e-Meeting, Oct. 26-Nov. 13, 2020 (Year: 2020).*

(Continued)

*Primary Examiner* — Mohammed S Chowdhury
(74) *Attorney, Agent, or Firm* — Fay Kaplun & Marcin, LLP

(57) ABSTRACT

A user equipment (UE) configured to operate in a radio resource control (RRC) connected state with a network cell, receive an RRC message to release or suspend the RRC connected state, the RRC message including an indication for a tracking reference signal (TRS) or channel state information reference signal (CSI-RS) configuration to use during an RRC inactive or idle state, enter the RRC inactive or idle state and apply the TRS or CSI-RS configuration for performing timing and frequency error estimation for decoding downlink control information.

19 Claims, 8 Drawing Sheets

(51) Int. Cl.
*H04W 52/02* (2009.01)
*H04W 56/00* (2009.01)
*H04W 68/02* (2009.01)
*H04W 76/27* (2018.01)

(52) U.S. Cl.
CPC ....... *H04W 56/0035* (2013.01); *H04W 68/02* (2013.01); *H04W 76/27* (2018.02)

(58) Field of Classification Search
CPC ......... H04W 52/0216; H04W 52/0274; H04W 56/00; H04W 52/0209; H04B 7/0626; H04L 27/2675
See application file for complete search history.

(56) References Cited

U.S. PATENT DOCUMENTS

2022/0132518 A1* 4/2022 Lee ..................... H04W 68/005
2023/0032154 A1* 2/2023 Hwang ................. H04L 5/0053
2023/0143590 A1* 5/2023 Li ......................... H04L 5/0051 370/329
2023/0246764 A1* 8/2023 Laselva ............... H04L 27/2675 370/329
2023/0276387 A1* 8/2023 Laselva ................. H04W 68/02 370/503
2024/0014870 A1* 1/2024 Ben Hadj Fredj ... H04B 7/0639
2024/0039669 A1* 2/2024 Koskela ................ H04L 5/0094

OTHER PUBLICATIONS

3GPP TSG RAN WG1 Meeting #103-e; R1-2009106; Source: Lenovo, Motorola Mobility; Title: Provision of TRS/CSI-RS for idle/inactive UEs; e-Meeting, Oct. 26-Nov. 13, 2020. (Year: 2020).*

3GPP TSG RAN WG1 Meeting #103-e; R1-2008965; Source: MediaTek Inc.; Title: On TRS/CSI-RS occasion(s) for idle/inactive mode UE power saving; e-Meeting, Oct. 26-Nov. 13, 2020. (Year: 2020).*

3GPP TSG-RAN WG1 #103-e; R1-2008288; Source: Panasonic; Title: Potential enhancements for TRS/CSI-RS occasion(s) for idle/inactive UEs; e-Meeting, Oct. 26-Nov. 6, 2020 (Year: 2020).*

* cited by examiner

5G NR TRS/CSI-RS SIGNALING ASPECTS FOR ENHANCED UE POWER SAVING

TECHNICAL FIELD

This application relates generally to wireless communication, and in particular relates to 5G NR TRS/CSI-RS Signaling Aspects for Enhanced UE Power Saving.

BACKGROUND INFORMATION

In NR, discontinuous reception (DRX) and connected mode DRX (CRDX) operation is supported for user equipment (UE) power saving. When a UE sleeps for a long duration during DRX or CDRX operation, the UE may have a large frequency and timing error upon waking up. The large frequency and timing offset may impact the UE decoding of downlink control information (DCI) and physical downlink shared channel (PDSCH). Further, the 'always on' signal used in LTE, e.g. the cell-specific reference signal (CRS), is removed in NR, introducing further challenges for the UE to acquire timing and frequency error estimation.

SUMMARY

Some exemplary embodiments are related to a processor of a user equipment (UE) configured to perform operations. The operations include operating in a radio resource control (RRC) connected state with a network cell, receiving an RRC message to release or suspend the RRC connected state, the RRC message including an indication for a tracking reference signal (TRS) or channel state information reference signal (CSI-RS) configuration to use during an RRC inactive or idle state, entering the RRC inactive or idle state and applying the TRS or CSI-RS configuration for performing timing and frequency error estimation for decoding downlink control information.

Other exemplary embodiments are related to a processor of a user equipment (UE) configured to perform operations. The operations include entering a radio resource control (RRC) inactive or idle state with a network cell, receiving a paging message for receiving downlink control information (DCI), the paging message further including an indication for a tracking reference signal (TRS) or channel state information reference signal (CSI-RS) configuration to use during the RRC inactive or idle state, applying the TRS or CSI-RS configuration and performing timing and frequency error estimation for the IRS or CSI-RS for decoding the DCI Still further exemplary embodiments are related to a processor of a user equipment (UE) configured to perform operations. The operations include entering a radio resource control (RRC) inactive or idle state with a network cell, requesting on demand system information (ODSI) for a tracking reference signal (TRS) or channel state information reference signal (CSI-RS) configuration to use during the RRC inactive or idle state, receiving a system information block (SIB) comprising an indication for the TRS or CSI-RS configuration and applying the TRS or CSI-RS configuration for performing timing and frequency error estimation for decoding downlink control information.

Additional exemplary embodiments are related to a user equipment (UE) having a transceiver configured to communicate with a network cell and a processor communicatively coupled with the transceiver and configured to perform operations. The operations include operating in a radio resource control (RRC) connected state with the network cell, receiving an RRC message to release or suspend the RRC connected state, the RRC message including an indication for a tracking reference signal (TRS) or channel state information reference signal (CSI-RS) configuration to use during an RRC inactive or idle state, entering the RRC inactive or idle state and applying the IRS or CSI-RS configuration for performing timing and frequency error estimation for decoding downlink control information.

Further exemplary embodiments are related to a user equipment (UE) having a transceiver configured to communicate with a network cell and a processor communicatively coupled with the transceiver and configured to perform operations. The operations include entering a radio resource control (RRC) inactive or idle state with the network cell, receiving a paging message for receiving downlink control information (DCI), the paging message further including an indication for a tracking reference signal (IRS) or channel state information reference signal (CSI-RS) configuration to use during the RRC inactive or idle state, applying the TRS or CSI-RS configuration and performing timing and frequency error estimation for the TRS or CSI-RS for decoding the DCI.

Other exemplary embodiments are related to a user equipment (UE) having a transceiver configured to communicate with a network cell and a processor communicatively coupled with the transceiver and configured to perform operations. The operations include entering a radio resource control (RRC) inactive or idle state with the network cell, requesting on demand system information (ODSI) for a tracking reference signal (TRS) or channel state information reference signal (CSI-RS) configuration to use during the RRC inactive or idle state, receiving a system information block (SIB) comprising an indication for the TRS or CSI-RS configuration and applying the IRS or CSI-RS configuration for performing timing and frequency error estimation for decoding downlink control information.

DETAILED DESCRIPTION

Figure 1:
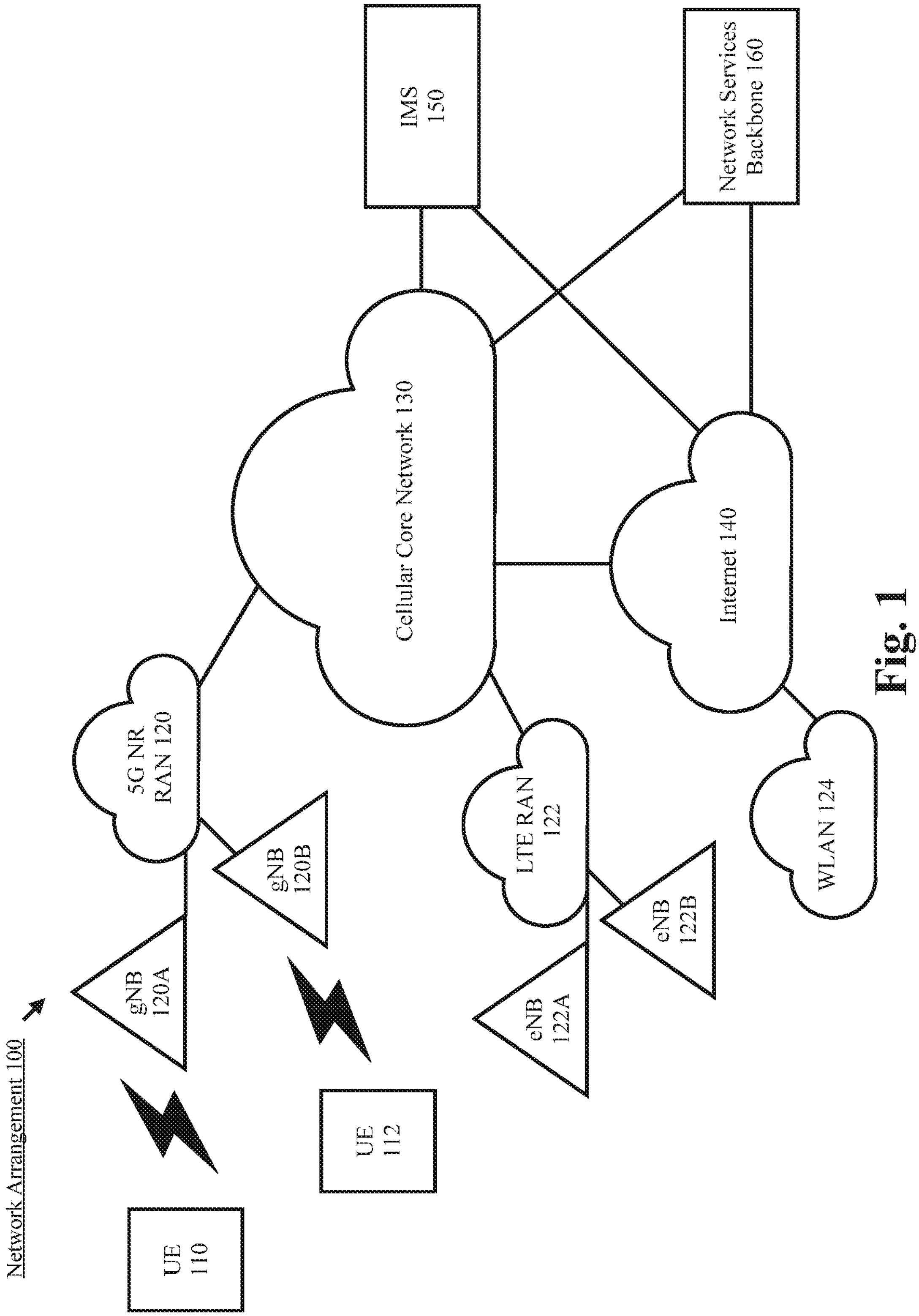
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe operations for tracking reference signal (TRS) or channel state information reference signal (CSI-RS) use and configuration signaling for idle/inactive state user equipment (UEs). Different options exist for TRS/CSI-RS configuration for idle/inactive state UEs to enable enhanced power saving, which may depend on UE context, e.g. whether the UE is transitioning from the connected state to the idle/inactive state on a cell or newly entering a cell. Additionally, a TRS/CSI-RS configuration may be modified, turned off or turned on for an idle/inactive state UE. According to various exemplary embodiments described herein, a new SIB is defined, referred to herein as SIB-X, which is specific for signaling TRS/CSI-RS configuration information and may be received in the idle/inactive state.

Network/Devices

FIG. 1 shows an exemplary network arrangement 100 according to various exemplary embodiments. The exemplary network arrangement 100 includes a plurality of UEs 110, 112. Those skilled in the art will understand that the UEs may be any type of electronic component that is configured to communicate via a network, e.g., a component of a connected car, a mobile phone, a tablet computer, a smartphone, a phablet, an embedded device, a wearable, an Internet of Things (IoT) device, etc. It should also be understood that an actual network arrangement may include any number of UEs being used by any number of users. Thus, the example of two UEs 110, 112 is merely provided for illustrative purposes. In some of the exemplary embodiments described below, groups of UEs may be employed to conduct respective channel measurements.

The UEs 110, 112 may communicate directly with one or more networks. In the example of the network configuration 100, the networks with which the UEs 110, 112 may wirelessly communicate are a 5G NR radio access network (5G NR-RAN) 120, an LTE radio access network (LTE-RAN) 122 and a wireless local access network (WLAN) 124. Therefore, the UEs 110, 112 may include a 5G NR chipset to communicate with the 5G NR-RAN 120, an LTE chipset to communicate with the LTE-RAN 122 and an ISM chipset to communicate with the WLAN 124. However, the UEs 110, 112 may also communicate with other types of networks (e.g. legacy cellular networks) and the UE 110 may also communicate with networks over a wired connection. With regard to the exemplary embodiments, the UEs 110, 112 may establish a connection with the 5G NR-RAN 120 and/or the LTE-RAN 122.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN 120 via at least one of the next generation nodeB (gNB) 120A and/or the gNB 120B. Reference to two gNBs 120A, 120B is merely for illustrative purposes. The exemplary embodiments may apply to any appropriate number of gNBs. For example, the UEs 110, 112 may simultaneously connect to and exchange data with a plurality of gNBs in a multi-cell CA configuration. The UEs 110, 112 may also connect to the LTE-RAN 122 via either or both of the eNBs 122A, 122B, or to any other type of RAN, as mentioned above. In the network arrangement 100, the UE 110 is shown as having a connection to the gNB 120A, while the UE 112 is shown as having a connection to gNB 120B.

In addition to the networks 120, 122 and 124 the network arrangement 100 also includes a cellular core network 130, the Internet 140, an IF Multimedia Subsystem (IMS) 150, and a network services backbone 160. The cellular core network 130 may be considered to be the interconnected set of components that manages the operation and traffic of the cellular network, e.g. the 5GC for NR. The cellular core network 130 also manages the traffic that flows between the cellular network and the Internet 140.

The IMS 150 may be generally described as an architecture for delivering multimedia services to the UE 110 using the IF protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
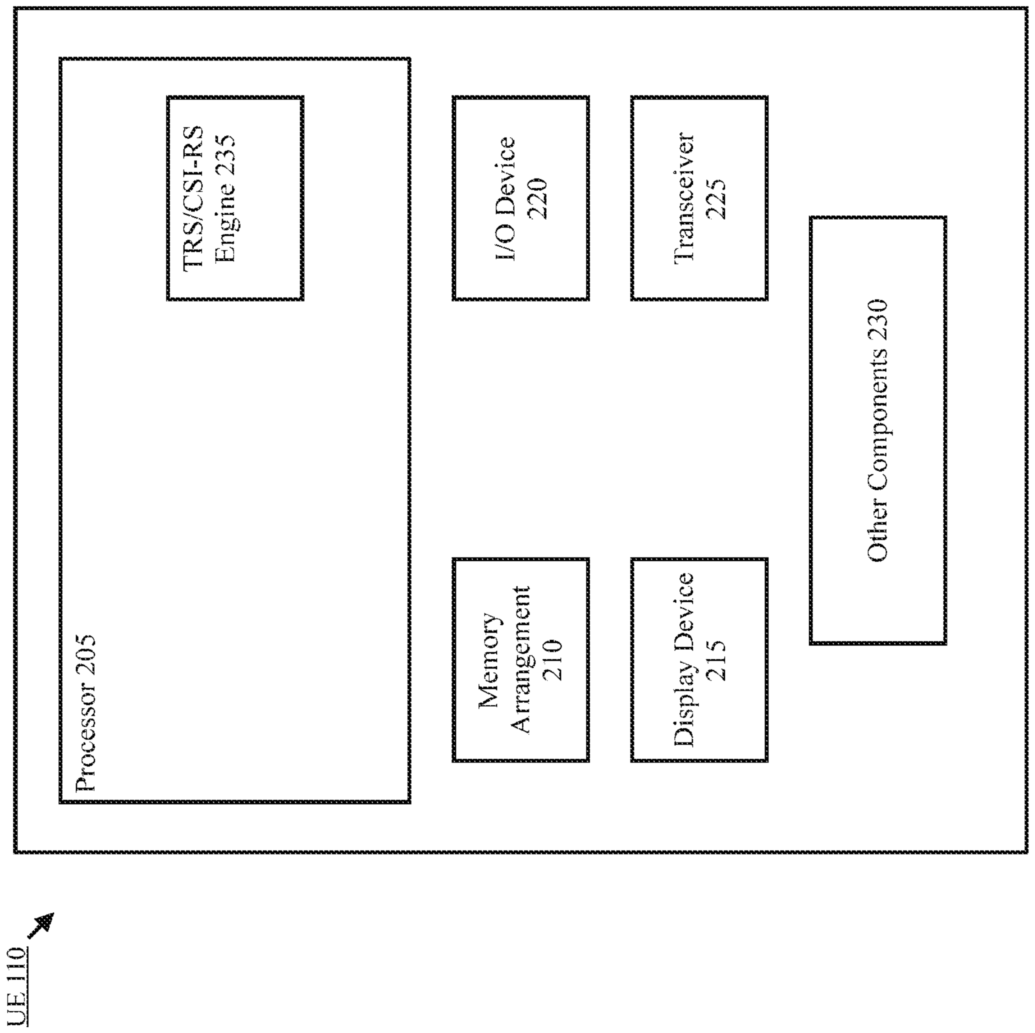
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc. The UE 110 illustrated in FIG. 2 may also represent the UE 112.

The processor 205 may be configured to execute a plurality of engines for the UE 110. For example, the engines may include a TRS/CSI-RS engine 235 for performing operations including applying a TRS/CSI-RS configuration when the UE is in the RRC idle/inactive state for performing timing and frequency error estimation, to be described in further detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies). For example, the transceiver 225 may operate on the unlicensed spectrum when e.g. NR-U is configured.

Figure 3:
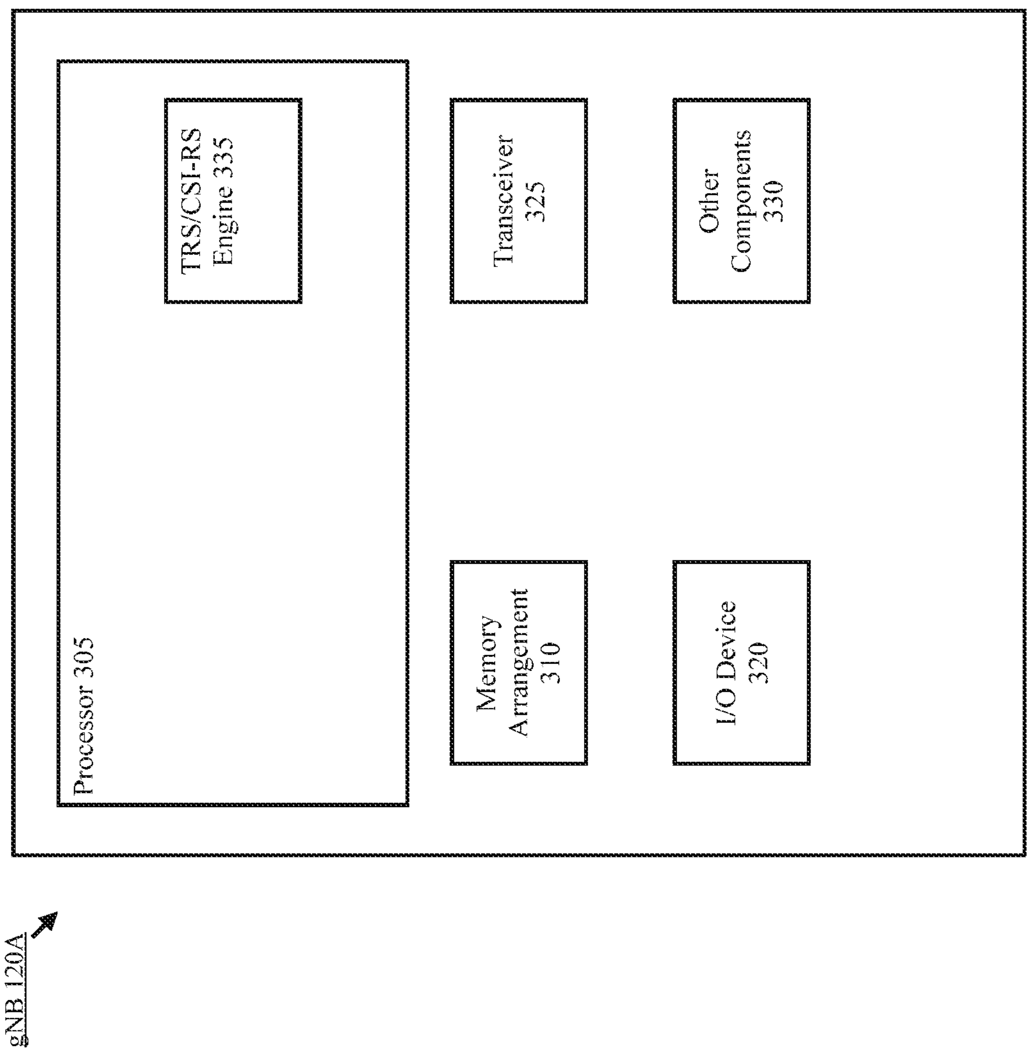
FIG. 3 shows an exemplary network cell according to various exemplary embodiments.

FIG. 3 shows an exemplary network cell, in this case gNB 120A, according to various exemplary embodiments. As noted above with regard to the UE 110, the gNB 120A may represent a cell providing services as a PCell or an SCell, or in a standalone configuration with the UE 110. The gNB 120A may represent any access node of the 5G NR network through which the UEs 110, 112 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a TRS/CSI-RS engine 335 for performing operations including transmitting a TRS/CSI-RS configuration for a UE to use in the RRC idle/inactive state for performing timing and frequency error estimation, to be described in further detail below.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100. The transceiver 325 may operate on a variety of different frequencies or channels (e.g., set of consecutive frequencies). For example, the transceiver 325 may operate on unlicensed bandwidths when NR-U functionality is configured. Therefore, the transceiver 325 may include one or more components (e.g., radios) to enable the data exchange with the various networks and UEs.

TRS/CSI-RS for Idle/Inactive UEs

In NR, discontinuous reception (DRX) and connected mode DRX (CDRX) operation is supported for user equipment (UE) power saving. CDRX operation is supported for a UE in the RRC connected state and comprises an On Duration in which the UE monitors the PDCCH for data scheduling. DRX operation is supported for a UE in the RRC idle/inactive state and comprises an On Duration in which the UE monitors for downlink control information (DCI) during paging opportunities.

In NR, when a UE sleeps for a long duration during DRX or CDRX operation, the UE may have a large timing and frequency (T/F) error upon waking up (entering its On Duration). The large T/F offset may impact the UE decoding of DCI and PDSCH. Further, the 'always on' signal used in LTE, e.g. the cell-specific reference signal (CRS), is removed in NR, introducing further challenges for the UE to acquire T/F estimation.

A tracking reference signal (TRS) is introduced in NR to assist the UE in T/F error estimation. The TRS design is similar to the CRS design, however, the TRS cannot be assigned in RRC idle/inactive mode. A channel state information reference signal (CSI-RS) may also be used to assist T/F tracking. Before DRX wakeup, to prepare the DCI and PDSCH demodulation, the UE may perform pre-processing for T/F tracking. If there is no dense RS configured before DRX wake up it can lead to a significant increase in UE power consumption.

Enhanced NR UE power saving objectives have been defined for 3GPP R17. One objective for enhanced NR UE power saving includes specifying enhancements for idle/inactive-state UE power saving, considering system performance aspects, which includes a) specifying paging enhancement(s) to reduce unnecessary UE paging receptions, subject to no impact to legacy UEs, and b) specifying means to provide potential TRS/CSI-RS occasion(s) available in connected mode to idle/inactive-mode UEs, minimizing a system overhead impact. It is noted that always-on TRS/CSI-RS is not required to be transmitted by the gNB.

A UE in the connected state uses the TRS/CSI-RS to help with T/F tracking. The TRS/CSI-RS configuration is assigned to a UE in the connected state, but can be shared across multiple UEs. That is, the network can configure the same TRS/CSI-RS configuration across multiple connected state UEs in the same cell. A gNB can schedule its resources to signal the TRS/CSI-RS configuration based on its internal implementation, and can potentially turn off the TRS/CSI-RS in some cases (e.g. when no further connected state UEs are in the current cell). NR UEs in the idle/inactive state typically acquire the synchronization signal block (SSB) prior to a paging decode occasion for T/F tracking, as there is no cell specific reference signal (CRS) in NR. A UE can potentially reuse a TRS/CSI-RS to minimize SSB decoding prior to a paging decode, resulting in power saving.

RAN working groups (WG) have imposed some limitations for the TRS/CSI-RS design in 5G NR. In one design objective, it was determined that no new type(s) of TRS/CSI-RS are to be introduced specifically for idle/inactive state UEs. In another design objective, it was determined that TRS/CSI-RS for idle/inactive state UEs are to be shared with connected state UEs being served by the same gNB. In a third design objective, it was determined that RRM functionality for neighbor cells is not supported for TRS/CSI-RS for idle/inactive state UEs. In a fourth design objective, aperiodic TRS or semi-persistent/aperiodic CSI-RS are not to be used as TRS/CSI-RS occasions for idle/inactive state UEs.

TRS/CSI-RS Signaling Enhancement for Idle/Inactive UEs

To meet the various design objectives discussed above and provide enhanced power saving for idle/inactive UEs, the exemplary embodiments describe operations for TRS/CSI-RS use and configuration signaling for idle/inactive state UEs. Different options exist for TRS/CSI-RS configuration for idle/inactive state UEs to enable enhanced power saving, which may depend on UE context, e.g. whether the UE is transitioning from the connected state to the idle/inactive state on a cell or newly entering a cell.

According to various exemplary embodiments described herein, operations are defined for a UE transitioning from the connected state to the idle/inactive state, to be described in detail below. Operations are also defined for UEs that have not yet entered the connected state in the current cell, e.g. UEs just powered on and performing initial cell selection or UEs that reselected into the current cell from another cell, to be described in detail below. Additionally, a TRS/CSI-RS configuration may be modified, turned off or turned on for an idle/inactive state UE.

According to various exemplary embodiments described herein, a new SIB is defined, referred to herein as SIB-X, which is specific for signaling TRS/CSI-RS configuration information and may be received in the idle/inactive state. The new SIB-X does not impact existing non-R17 UEs, which do not need this additional information. The new SIB-X may be configured as on-demand system information (ODSI) (not part of MIB/SIB1) to reduce the overall system signaling load. That is, only R17 power saving-capable UEs would request this on-demand, and non-R17 UEs would not request or receive this information.

The new SIB-X does not have any size restriction on the number of TRS/CSI-RS configurations that can be provided to the idle/inactive UEs. Thus, there is a possibility for the gNB to signal sets of multiple potential TRS/CSI-RS occasions, e.g. four potential TRS/CSI-RS occasions, for a UE. Different UEs can choose different TRS/CSI-RS configuration occasions based on the location of the idle/inactive DRX state for the UE, relative to the indicated set.

According to a first option, the gNB does not explicitly indicate the configuration to the UE and the UE learns the configuration by blind decoding based on a connected state configuration. In this option, the UE learns the available TRS/CSI-RS resource occasion closest to its idle/inactive state DRX occasion and uses the closest TRS/CSI-RS resource for T/F tracking. In a second option, the gNB explicitly indicates a TRS/CSI-RS configuration to the UE to use when the UE goes into the idle/inactive state. The gNB may indicate a configuration applicable to idle/inactive UEs based on a previous connected mode configuration. Alternatively, the gNB may indicate a configuration applicable to idle/inactive UEs based on a specific broadcast parameter.

According to various exemplary embodiments described herein, the gNB may use the SIB-X to indicate a maximum set of TRS/CSI-RS configurations that it can support for idle/inactive UEs, (TRS_CSI_RS_MAX_CONFIG_SET). The gNB uses the new SIB-X to broadcast all possible configuration sets of TRS/CSI-RS configurations that it can potentially schedule (though not all at the same time). For example, the SIB may indicate a set of 4 TRS/CSI-RS configurations (config_1/config_2/config_3/config_4). It is noted that UEs in the connected state could also be using one of the configurations indicated in the set.

With regard to the exemplary embodiments introduced above for enhanced power saving, the UE and the network may communicate to indicate that the UE and the network support the functionality associated with TRS/CSI-RS configuration in the idle/inactive state. The UE may indicate to the network (e.g., the gNB) that the UE has the capability for enhanced UE power saving. Alternatively, the UE may indicate to the network that the UE has the capability to use TRS/CSI-RS information/configurations for the idle/inactive state. For example, the capability may be reported as part of the information element (IE) UECapabilityInformation (access stratum (AS) level) or during an initial ATTACH REQUEST/REGISTRATION REQUEST (NAS level). When the network is notified of the UE capability, it may e.g. intelligently assign any signaling during the exiting of the connected state (e.g. RRC release). The gNB may also indicate to the UE that the gNB includes the capability to use TRS/CSI-RS information/configurations for the idle/inactive state. For example, the network capability may be reported as part of the ATTACH ACCEPT/REGISTRATION ACCEPT or broadcast as part of an existing System Information Block (SIB) or a new MUSIM specific SIB. However, this network capability is already implicitly indicated by the availability of the SIB-X and need not be explicitly indicated. Thus, prior to the signaling as described in FIGS. 4-7 below, the UE and the network may understand that each supports the use of TRS/CSI-RS information in the idle/inactive state.

TRS/CSI-RS Indication for UEs Transitioning from Connected State to Idle/Inactive State on Current Cell As mentioned above, for UEs transitioning from the connected state to the idle/inactive state, the UE may continue using the connected state configuration for TRS/CSI-RS. As discussed above, a TRS/CSI-RS configuration is assigned to a UE in the connected state. In some embodiments, in the absence of any further indication from the network, the UE may continue to use the previous (connected state) TRS/CSI-RS configuration. If multiple TRS/CSI-RS were previously assigned in the connected state, the UE entering the idle/inactive state may blindly decode the configured TRS/CSI-RS to find the occasion closest to its DRX period.

In other embodiments, the network may signal additional information in an RRC Release or RRC Suspend message. Specifically, the network may indicate an index value corresponding to a TRS/CSI-RS configuration for the UE to use while in the idle/inactive state. In one option, the index value may correspond to a connected state TRS/CSI-RS configuration the UE used while in the connected state. In another option, the index value may correspond to a new set of TRS/CSI-RS configurations to be received later as part of system information (SI), e.g. in the SIB-X. When the UE later acquires the set of TRS/CSI-RS configurations, the configuration corresponding to the index value may be used. Thus, in this manner, the TRS/CSI-RS configuration may be changed for a UE transitioning from the connected state to the idle/inactive state.

Figure 4:
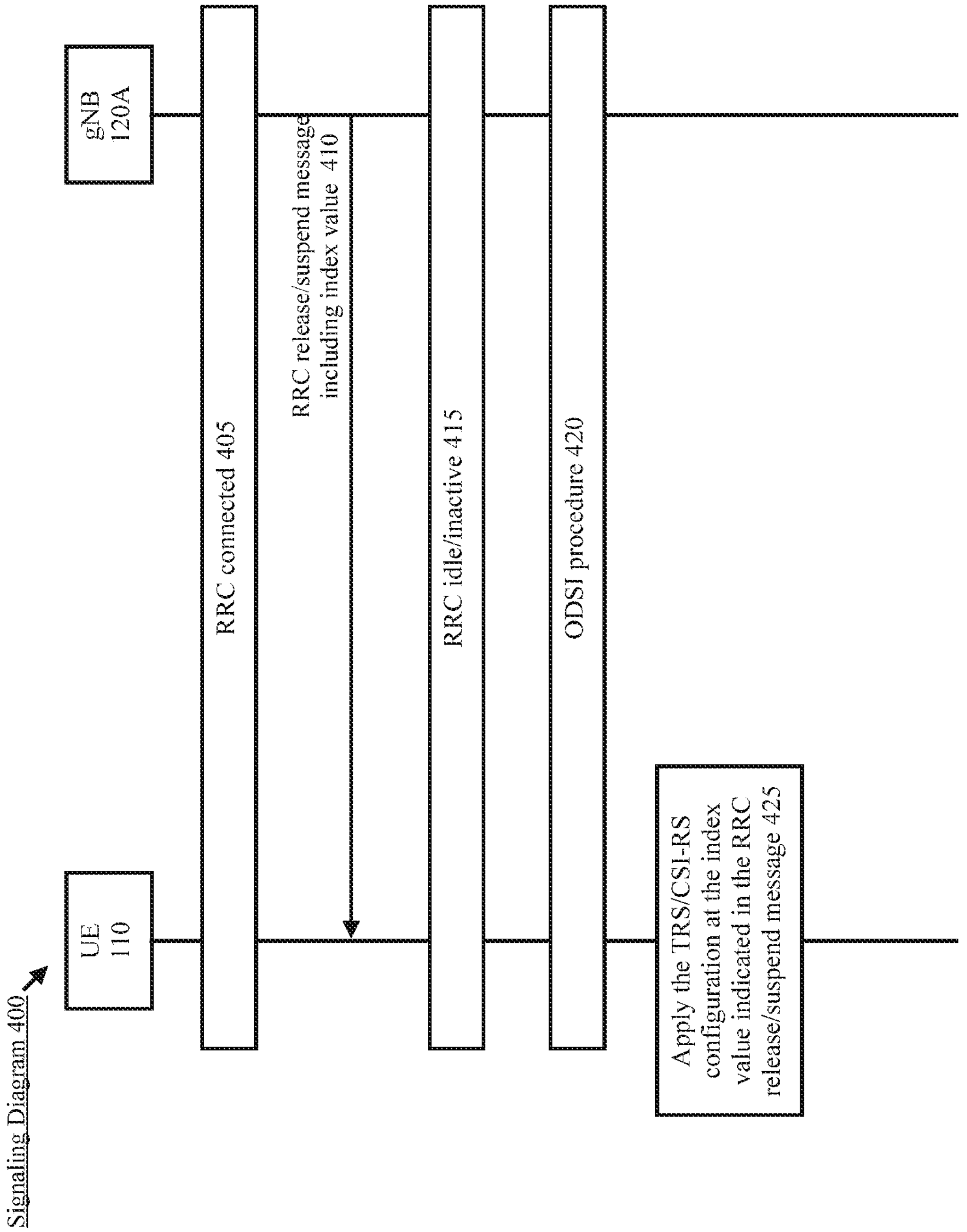
FIG. 4 shows a signaling diagram for indicating a TRS/CSI-RS configuration in an RRC release/suspend message for a UE to use in the idle/inactive state.

FIG. 4 shows a signaling diagram 400 for indicating a TRS/CSI-RS configuration in an RRC release/suspend message for a UE to use in the idle/inactive state. In this example, the UE is transitioning from the connected state to the idle/inactive state. In 405, a UE and a gNB enter into the RRC connected state on a cell and a TRS/CSI-RS configuration is assigned to the UE. In 410, the gNB transmits an RRC release/suspend message to the UE for the UE to enter the RRC inactive/idle state with the gNB. Included in the RRC release/suspend message is an indication, e.g. an index value, for a TRS/CSI-RS configuration for the UE to use while in the inactive/idle state.

In 415, the UE enters the idle/inactive state. If the UE is to use one of the TRS/CSI-RS configurations used while in the connected state, the UE would immediately apply the TRS/CSI-RS configuration corresponding to the index value. If the UE is to use a TRS/CSI-RS configuration from a new set of configurations, in 420, the UE initiates an on demand system information (ODSI) procedure, which includes requesting the TRS/CSI-RS configuration information and receiving the SIB-X including the set of TRS/CSI-RS configurations. In 425, the UE applies the TRS/CSI-RS configuration at the index value indicated in the RRC release/suspend message.

TRS/CSI-RS Indication for UEs Entering Idle/Inactive State on New Cell

When a UE is entering a new cell for the first time, e.g., when the UE has just powered on and is performing initial cell selection or has reselected into the current cell from another cell, the UE initially enters the idle/inactive state. Accordingly, the UE has not yet been configured with a TRS/CSI-RS for the connected state, and thus has no previous TRS/CSI-RS configurations to use while in the idle/inactive state.

According to one embodiment, the TRS/CSI-RS configuration for a UE entering a new cell may be indicated as part of a paging message (PDSCH or PDCCH). That is, the paging message carries one or more TRS/CSI-RS configurations to be used by the UE in the idle/inactive state. Notably, when the UE is configured with a TRS/CSI-RS in this manner, the UE does not need to first decode one or more SSBs to acquire T/F tracking information prior to decoding the PDCCH/PDSCH.

Figure 5:
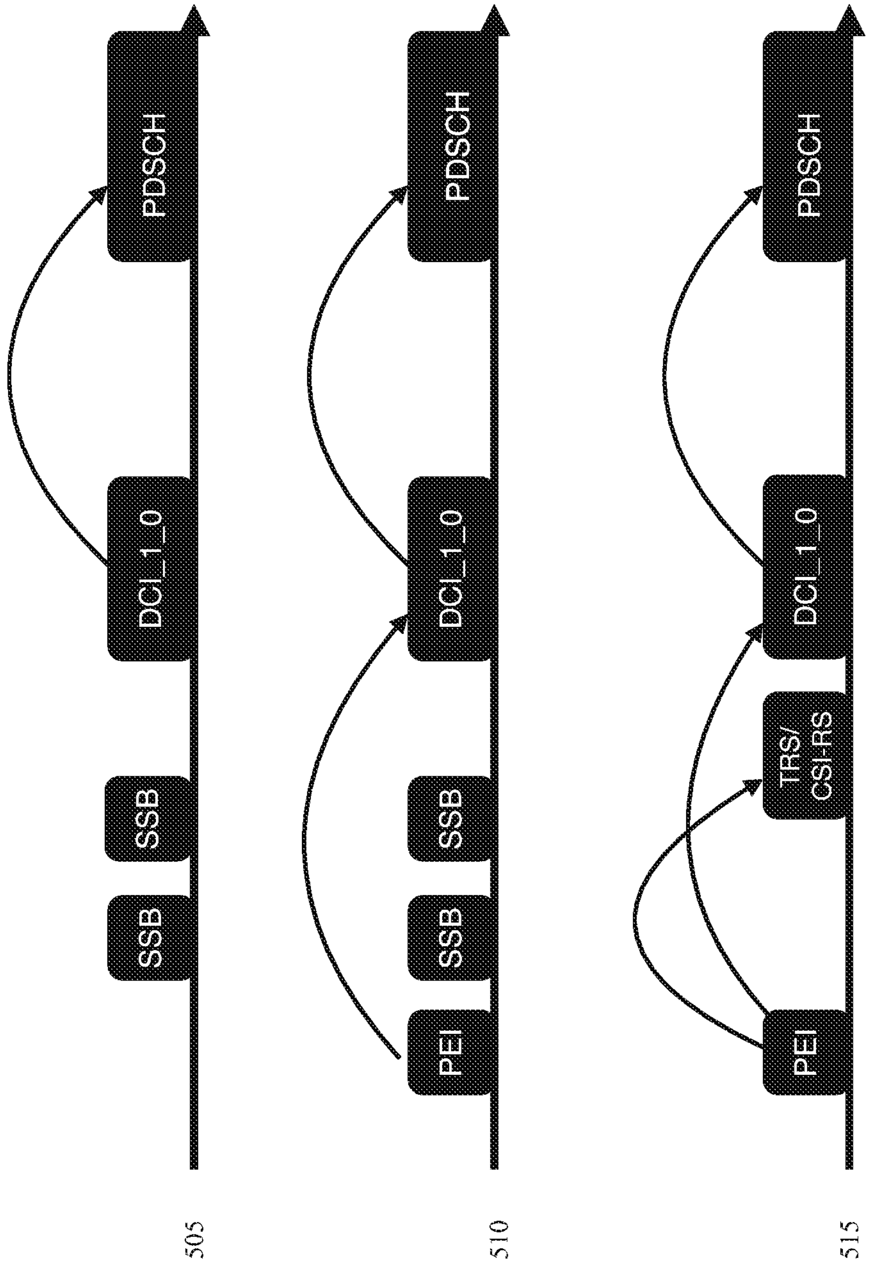
FIG. 5 shows a series of signaling diagrams for decoding a PDCCH/PDSCH.

FIG. 5 shows a series of signaling diagrams for decoding a PDCCH/PDSCH. In a first diagram 505, according to legacy operations, two SSBs are used for timing and frequency (T/F) tracking for decoding downlink control information (DCI) on the PDCCH. The decoded DCI is further used to decode the PDSCH.

In a second diagram 510, according to Rel 17, a paging early indication (PEI) or a wakeup signal (WUS) is used to carry some information for decoding DCI on the PDCCH. Similar to the first diagram 505, two SSBs are used for T/F tracking for decoding the PDCCH.

In a third diagram 515, according to various exemplary embodiments described herein, the PEI/WUS is configured to carry additional information, specifically a TRS/CSI-RS indicator for configuring a TRS/CSI-RS for the UE. Thus, the SSBs need not be used for T/F tracking for decoding the PDCCH. Thus, the SSBs need not be fully decoded prior to decoding the PDCCH, resulting in power savings.

According to other embodiments, when a UE is newly powered on in a cell, or reselecting into the cell, the UE can use the ODSI procedure discussed above to request the active TRS/CSI-RS configuration to be applied during the idle/inactive state. The active TRS/CSI-RS configuration index may be signaled as part of the new SIB-X itself, or may be signaled as an extension of SIB1.

TRS/CSI-RS Configuration Modification for UEs in the Idle/Inactive State

According to various exemplary embodiments described herein, the network may decide to change a TRS/CSI-RS configuration for an idle/inactive UE in a cell. The network may use an SIB modification procedure (Short Message with PRNTI with systemInfoModification set to TRUE). The subsequently transmitted SIB-X may indicate either 1) an active index change to specify a new index value or 2) a configuration value change itself, wherein all the previous stored TRS/CSI-RS configurations are discarded.

Figure 6:
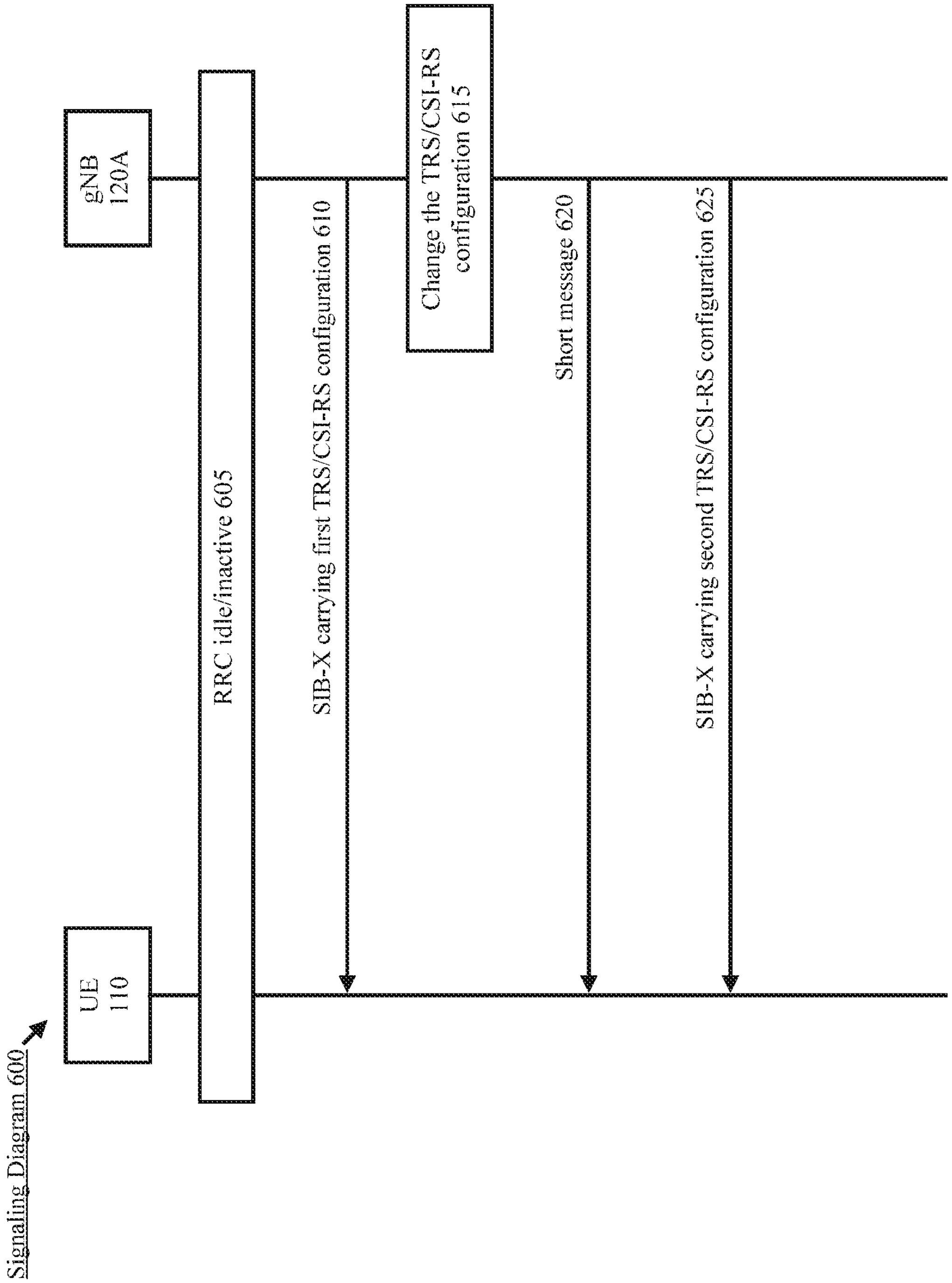
FIG. 6 shows a signaling diagram for indicating a TRS/CSI-RS configuration change for a UE to use in the idle/inactive state.

FIG. 6 shows a signaling diagram 600 for indicating a TRS/CSI-RS configuration change for a UE to use in the idle/inactive state. In 605, a UE and a gNB enter into the RRC idle/inactive state in a current cell. The UE may have previously entered into the RRC connected state in the cell, or may be, e.g., newly powered on or reselected into the current cell, and accordingly does not yet have a TSI/CSI-RS configuration. In 610, the gNB transmits a first SIB-X to the UE carrying at least one TRS/CSI-RS configuration for the UE, for example as part of the ODSI procedure discussed above with respect to FIG. 4.

In 615, the network decides to change the TRS/CSI-RS configuration in the cell. In 620, the gNB indicates a forthcoming change to the TRS/CSI-RS configuration, for example using a system information modification procedure comprising a short message with a P-RNTI for the UE and a systernInfoModification parameter set to "true."

In 625, the UE receives a second SIB-X from the gNB including the TRS/CSI-RS modification. Thus, the second SIB-X carries a TRS/CSI-RS configuration different from the first SIB-X. In one embodiment, the message may indicate an active index change to specify a new index value to be used from the previously transmitted (first) SIB. In another embodiment, the message may indicate a new set of TRS/CSI-RS configurations to be used by the UE in the inactive/idle state.

According to further exemplary embodiments described herein, a gNB may choose to completely turn off the TRS/CSI-RS configuration. The gNB may choose to do so because there are no more UEs in the connected state in the cell, or for any other internal implementation reason (e.g. resource constraint). To notify an idle/inactive UE of the change, similar to above, the gNB may send a short message with the systemInfoModification bit set to 1. The gNB may then send the new SIB-X, indicating the TRS/CSI-RS index reset and the non-availability of this configuration going forward in the current cell. If the gNB chooses to restart the TRS/CSI-RS configuration, for example because there is one or more new UEs in the connected state in the cell, or for any other internal implementation reason (e.g. resource availability), the gNB may send a further short message with the systemInfoModification bit set to 1. The gNB may then send the new SIB-X, indicating a valid TRS/CSI-RS index and the availability of the TRS/CSI-RS configuration going forward in the current cell.

Figure 7A:
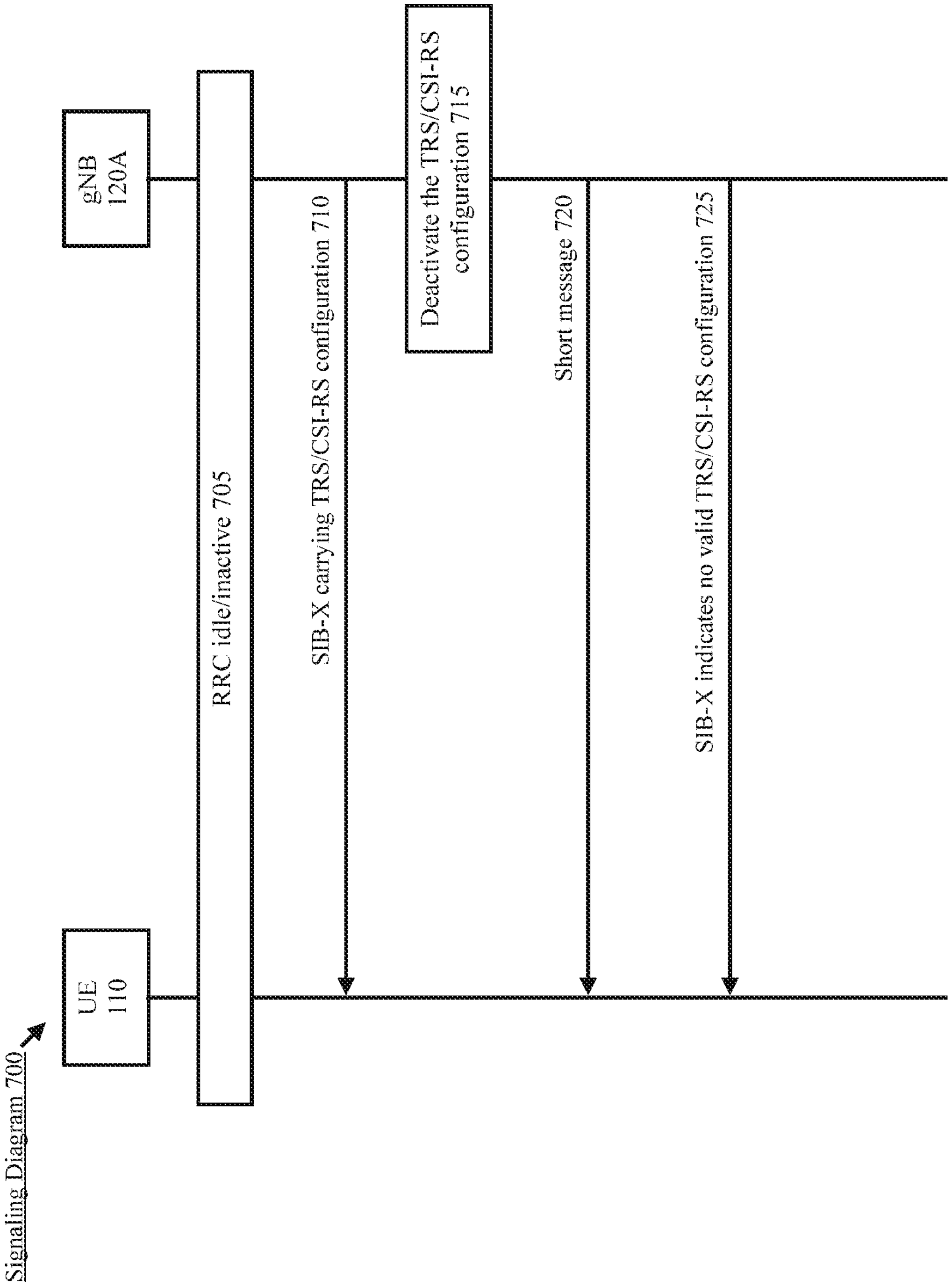
FIG. 7*a* shows a signaling diagram for indicating a TRS/CSI-RS configuration deactivation for a UE in the idle/inactive state.

FIG. 7*a* shows a signaling diagram 700 for indicating a TRS/CSI-RS configuration deactivation for a UE in the idle/inactive state. In 705, a UE and a gNB enter into the RRC idle/inactive state in a current cell. In 710, the gNB transmits a first SIB-X to the UE carrying at least one TRS/CSI-RS configuration for the UE, for example as part of the ODSI procedure discussed above with respect to FIG. 4.

In 715, the network decides to deactivate the TRS/CSI-RS configuration in the cell. In 720, the gNB indicates a forthcoming change to the TRS/CSI-RS configuration, for example using a system information modification procedure comprising a short message with a P-RNTI for the UE and a systemInfoModification parameter set to "true." In 725, the UE receives a second SIB-X from the gNB indicating the TRS/CSI-RS index reset, e.g. that no valid TRS/CSI-RS is configured for idle/inactive UEs on the cell.

Figure 7B:
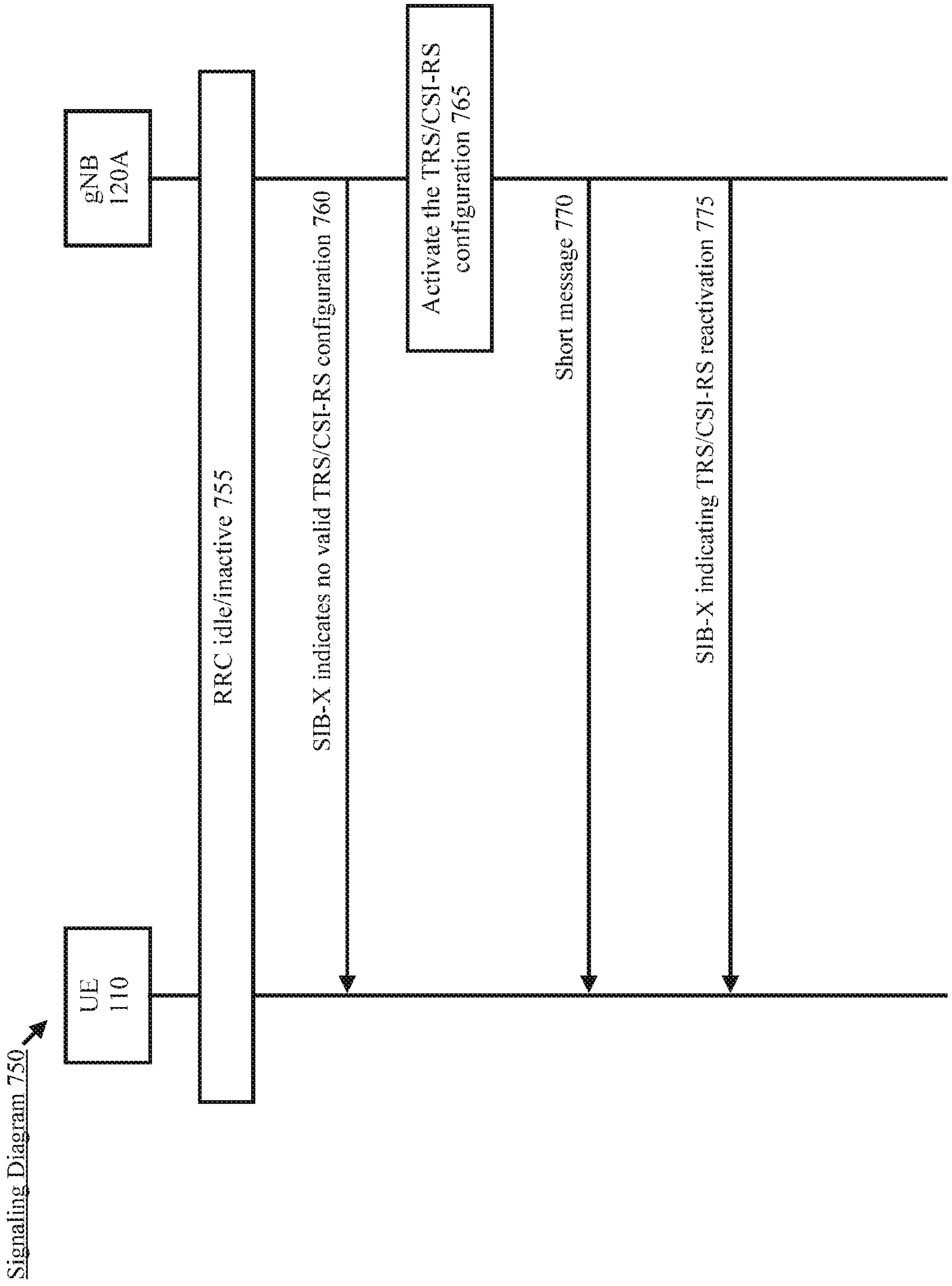
FIG. 7*b* shows a signaling diagram for indicating a TRS/CSI-RS configuration activation for a UE in the idle/inactive state.

FIG. 7*b* shows a signaling diagram 750 for indicating a TRS/CSI-RS configuration activation for a UE in the idle/inactive state. In 755, a UE and a gNB enter into the RRC idle/inactive state in a current cell. In 760, the gNB transmits a first SIB-X to the UE indicating that no valid TRS/CSI-RS is configured for idle/inactive UEs on the cell, similar to 725 above.

In 765, the network decides to activate the TRS/CSI-RS configuration in the cell. In 770, the gNB indicates a forthcoming change to the TRS/CSI-RS configuration, for example using a system information modification procedure comprising a short message with a P-RNTI for the UE and a systemInfoModification parameter set to "true." In 775, the UE receives a second SIB from the gNB indicating the TRS/CSI-RS index reactivation. The message may indicate a new set of TRS/CSI-RS configurations to be used by the UE in the inactive/idle state.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A processor of a network cell configured to:

operate in a radio resource control (RRC) connected state with a user equipment (UE);

configure transceiver circuitry to transmit an RRC message to release or suspend the RRC connected state, the RRC message including an indication for a tracking reference signal (TRS) or channel state information reference signal (CSI-RS) configuration to use during an RRC inactive or idle state, wherein the TRS or CSI-RS configuration is used by the UE for performing timing and frequency error estimation for decoding downlink control information;

enter the RRC inactive or idle state with the UE; and after entering the RRC inactive or idle state, configure transceiver circuitry to transmit a system information block (SIB) comprising a set of TRS or CSI-RS configurations for use during the RRC inactive or idle state, wherein the indication comprises an index value corresponding to one TRS or CSI-RS configuration from the set of TRS or CSI-RS configurations received in the SIB, wherein the set comprises a maximum number of TRS or CSI-RS configurations to be shared with user equipment (UEs) currently in the RRC connected state.

2. The processor of claim 1, wherein the processor is further configured to:

receive, from the UE, a message comprising a request that the SIB be transmitted as on demand system information.

3. A processor of a network cell configured to:

receive, from a user equipment (UE) in response to cell selection or cell reselection, a request for a system information block (SIB) that is dedicated for configurations of tracking reference signal (TRS) resources for Radio Resource Control (RRC) idle and inactive UEs;

configure transceiver circuitry to transmit the SIB that is dedicated for configurations of TRS resources for the RRC idle and inactive UEs, the SIB comprising a TRS configuration to be used during RRC idle and inactive state, wherein the UE applies the TRS configuration for performing timing and frequency error estimation for decoding downlink control information; and configure the transceiver circuitry to transmit a short message comprising a paging radio network temporary identifier (PRNTI) configured to indicate a change to the TRS configuration.

4. The processor of claim 3, wherein the SIB comprises a set of TRS configurations to be used in the RRC inactive or idle state.

5. The processor of claim 4, wherein the SIB further indicates an index value corresponding to one TRS configuration from the set of TRS configurations.

6. The processor of claim 3, wherein the processor is further configured to: configure the transceiver circuitry to transmit a system information modification message indicating a forthcoming change to the TRS configuration.

7. The processor of claim 6, wherein the processor is further configured to:

configure the transceiver circuitry to transmit a further SIB comprising an indication for the TRS configuration change.

8. The processor of claim 7, wherein the TRS configuration change includes a new set of TRS configurations to be used in the RRC inactive or idle state.

9. The processor of claim 7, wherein the TRS configuration change indicates a TRS configuration deactivation.

10. The processor of claim 9, wherein the processor is further configured to:

configure the transceiver circuitry to transmit a further system information modification message indicating a forthcoming change to the TRS configuration;

configure the transceiver circuitry to transmit a further SIB comprising an indication for a TRS or CSI-RS configuration reactivation.

11. The processor of claim 3, wherein the processor is further configured to:

receive, from the UE, a UE capability for support of enhanced UE power saving.

12. The processor of claim 3, wherein the processor is further configured to:

receive, from the UE, a UE capability for support of using TRS configuration information in the RRC inactive or idle state.

13. A method, comprising:

at a network cell:

receive, from a user equipment (UE) in response to cell selection or cell reselection, a request for a system information block (SIB) that is dedicated for configurations of tracking reference signal (TRS) resources for Radio Resource Control (RRC) idle and inactive UEs;

configure transceiver circuitry to transmit the SIB that is dedicated for configurations of TRS resources for the RRC idle and inactive UEs, the SIB comprising a TRS configuration to be used during RRC idle and inactive state, wherein the UE applies the TRS configuration for performing timing and frequency error estimation for decoding downlink control information; and configure the transceiver circuitry to transmit a short message comprising a paging radio network temporary identifier (PRNTI) configured to indicate a change to the TRS configuration.

14. The method of claim 13, wherein the SIB comprises a set of TRS configurations to be used in the RRC inactive or idle state.

15. The method of claim 13, wherein the SIB further indicates an index value corresponding to one TRS configuration from the set of TRS configurations.

16. The method of claim 13, wherein a further SIB indicates an index value corresponding to one TRS configuration from the set of TRS configurations.

17. The method of claim 13, further comprising: configure the transceiver circuitry to transmit a system information modification message indicating a forthcoming change to the TRS configuration.

18. The method of claim 17, further comprising: configure the transceiver circuitry to transmit a further SIB comprising an indication for the TRS configuration change.

19. The method of claim 18, wherein the TRS configuration change includes a new set of TRS configurations to be used in the RRC inactive or idle state.

* * * * *